(12) United States Patent
Varnoux et al.

(10) Patent No.: US 8,777,760 B2
(45) Date of Patent: Jul. 15, 2014

(54) DEVICE FOR TORQUE TRANSMISSION, ESPECIALLY FOR AN AIR-CONDITIONING COMPRESSOR

(75) Inventors: Laurent Varnoux, Saint-Avertin (FR); Romuald Lescorail, Saint Laurent en Gatines (FR)

(73) Assignee: Aktiebolaget SKF, Gothenburg (SE)

( * ) Notice: Subject to any disclaimer, the term of this patent is extended or adjusted under 35 U.S.C. 154(b) by 181 days.

(21) Appl. No.: 12/997,286

(22) PCT Filed: Jun. 5, 2009

(86) PCT No.: PCT/EP2009/056980
§ 371 (c)(1),
(2), (4) Date: Feb. 7, 2011

(87) PCT Pub. No.: WO2009/153177
PCT Pub. Date: Dec. 23, 2009

(65) Prior Publication Data
US 2011/0150673 A1    Jun. 23, 2011

(30) Foreign Application Priority Data
Jun. 19, 2008  (FR) ..................................... 08 54064

(51) Int. Cl.
*F16D 7/02*         (2006.01)
(52) U.S. Cl.
USPC ........................... 464/41; 474/902
(58) Field of Classification Search
CPC .. F16D 7/021; B62M 25/08; F16H 2055/366; Y10S 474/902
USPC .......................... 464/30, 41; 474/70, 902, 94
See application file for complete search history.

(56) References Cited

U.S. PATENT DOCUMENTS

| | | | | |
|---|---|---|---|---|
| 2,302,110 A | * | 11/1942 | Dow et al. ........................ | 464/41 |
| 2,731,814 A | * | 1/1956 | Gunkel ........................... | 464/30 |
| 2,855,079 A | * | 10/1958 | Spase ............................ | 464/41 |
| 4,003,628 A | * | 1/1977 | Halperin ..................... | 464/30 X |
| 5,607,023 A | * | 3/1997 | Palm | |
| 5,843,264 A | * | 12/1998 | Mabuchi et al. .............. | 474/902 |
| 2005/0077101 A1 | | 4/2005 | Yamamoto et al. | |
| 2006/0276246 A1 | * | 12/2006 | Needes et al. .................. | 464/30 |
| 2007/0066426 A1 | * | 3/2007 | Kamdem et al. ............... | 474/94 |

FOREIGN PATENT DOCUMENTS

| | | |
|---|---|---|
| FR | 2858376 A1 | 2/2005 |
| FR | 2863675 A1 | 6/2005 |
| JP | 08135686 A | 5/1996 |
| JP | 2000356226 A | 12/2000 |
| JP | 2007290635 A | 11/2007 |
| WO | WO0198678 A1 | 12/2000 |

* cited by examiner

*Primary Examiner* — Gregory Binda
(74) *Attorney, Agent, or Firm* — Bryan Peckjian; SKF USA Inc. Patent Department (57) ABSTRACT

The device for torque transmission between a drive pulley (1) and a shaft (2) comprises a coupling flange (4) rotationally driven by the pulley and a hub fitted at the shaft end and rotationally joined to the shaft, with torque limitation means fitted between the coupling flange (4) and the hub (3), characterized in that the torque limitation means comprise a friction ring (28) comprising a plurality of projecting elastic portions in friction contact with a surface of the coupling flange (4) and/or of the hub (3).

12 Claims, 6 Drawing Sheets

DEVICE FOR TORQUE TRANSMISSION, ESPECIALLY FOR AN AIR-CONDITIONING COMPRESSOR

CROSS-REFERENCE

This application claims priority to German patent application no. 10 2010 041 960.5 filed on Oct. 5, 2010 and German patent application no. 10 2010 038 677.4 filed on Jul. 30, 2010, the contents of both of which are incorporated by reference as if fully set forth herein.

BACKGROUND OF THE INVENTION

The present invention relates to the transmission of a torque between a drive pulley and a shaft driven by the pulley. A torque transmission device of this type may be used, in particular, in air-conditioning compressors such as those fitted to motor vehicles.

During the transmission of a torque between a drive pulley and a shaft driven by the pulley, and in particular in the case where a torque transmission device is used for driving an air-conditioning compressor, means for limiting the torque are generally provided, placed between the drive pulley and the driven shaft. Thus, in the event of too large a torque, resulting for example from seizing of the air-conditioning compressor, the pulley can continue to turn without driving the shaft or without slipping relative to the drive belt, which quickly leads to the destruction of this belt.

Japanese patent application JP 08-135686 uses a plurality of elastic elements squeezed between metal retaining elements as a means of torque limitation, the assembly being designed such that, in the event of too large a torque, the elastic elements escape from their normal drive position, thus eliminating torque transmission. These means are complex and therefore relatively expensive to manufacture and to assemble. In addition, they do not allow a return to torque transmission when the torque value has again become normal.

Japanese patent application JP 2000/356226 describes a torque limitation means comprising a friction system placed between the drive pulley and a coupling flange joined to the shaft of an air-conditioning compressor. The peripheral part of the coupling flange comprises on each of its faces a friction coating that cooperates on the one hand with a radial face of the pulley and on the other hand with a radial face of an annular transmission element joined to the drive pulley by a ribbed cylindrical surface. The manufacture of such a coupling flange with a double friction coating, along with the provision of a fitted transmission element, provided with ribs for joining to the pulley, proves to be complex and expensive.

Patent application WO 2005/021991 describes a rolling bearing associated with a freewheel device which comprises torque limitation means. These means consist of a friction element fitted in the freewheel support.

Patent application WO01/098678 describes a power-steering device with a screw system in which a ring gear is fitted directly onto the central portion of a shaft by means of a split annular ring comprising a plurality of bosses. Such an application is specific to a steering column, the relatively slow rotation of which makes only a few revolutions.

The subject of the present invention is a device for torque transmission between a drive pulley and a shaft rotationally driven by the pulley in which the torque limitation means are simple in structure and inexpensive to manufacture, which can easily be fitted at the shaft end, especially for a drive shaft of an air-conditioning compressor.

The subject of the present invention is also a transmission device comprising torque limitation means capable of interrupting the transmission of torque between the pulley and the driven shaft when the torque exceeds a threshold value, while allowing torque transmission to be resumed as soon as the torque value returns below this threshold value.

In one embodiment, a device for torque transmission between a drive pulley and a shaft comprises a coupling flange rotationally driven by the pulley and a hub fitted at the shaft end and rotationally joined to the shaft. Torque limitation means are fitted between the coupling flange and the hub and comprise a friction ring comprising a plurality of projecting elastic portions in friction contact with a surface of the coupling flange and/or of the hub. Thus, in the event of too large a torque between the drive pulley and the shaft, slippage intervenes and any risk of damage is avoided. As soon as the value of the torque returns below the slipping threshold, transmission takes place once again. The device is effective, simple to produce and to fit, and inexpensive.

The projecting elastic portions are preferably produced by deformation of the thin material constituting the elastic ring.

The projecting elastic portions may be undulations or bosses.

In one embodiment, the bosses occupy a central part of the friction ring, between two end parts lacking bosses.

The friction ring may be split or conversely closed.

In one embodiment, the friction ring is radially prestressed between two cylindrical bearing surfaces, the gap between which has a value less than the radial thickness of the ring.

In another embodiment, the friction ring is in the form of a flange radially prestressed between two radial surfaces, the gap between which has a value less than the axial thickness of said flange in the free state.

One or more elastic blocks may be fitted between the pulley and the coupling flange so as to damp torsional vibration.

According to another aspect, the invention also relates to an air-conditioning compressor, especially for motor vehicles, comprising a device, such as indicated above, for transmitting torque between a drive pulley and the compressor shaft.

The invention will be better understood by studying an embodiment taken by way of an example that is in no way limiting and illustrated by the appended drawings, in which.

DETAILED DESCRIPTION OF THE INVENTION

Figure 1:
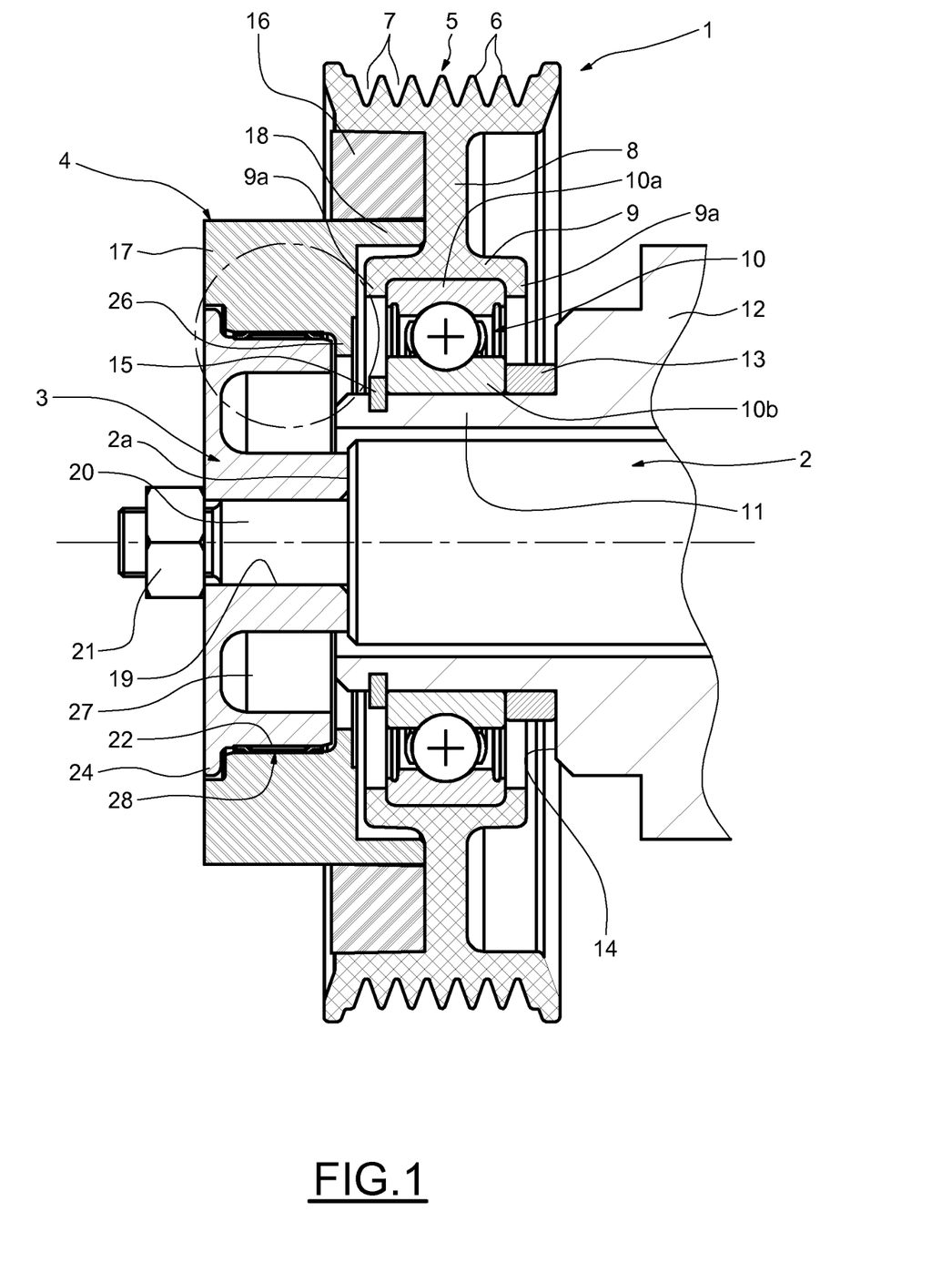
FIG. 1 is a cross-sectional view of an embodiment of the invention suited to an air conditioner shaft for a motor vehicle.

As is illustrated in the figures, the exemplary embodiment of the invention relates to a torque transmission device for an air-conditioning compressor on board a motor vehicle. In the embodiment illustrated, which can be seen especially in FIG.

1, the device comprises a drive pulley 1 intended to drive a shaft 2, which is here the input shaft of an air-conditioning compressor (not illustrated in the figure). A hub 3 is attached to a front shoulder 2a close to the end of the shaft 2. The device furthermore comprises a coupling flange 4 rotationally driven by the pulley 1.

More precisely, the pulley 1 has an external cylindrical part 5 provided with ribs 6 defining between them grooves 7 inside which V-belts or a single belt comprising corresponding ribs are housed, this belt not being shown in the figure. The pulley 1 has a radial flange 8 and an annular part 9 bounded by two radial rims 9a between which a rolling bearing 10, which is here a ball bearing, may be housed. The external ring 10a is housed between the rims 9a, while the internal ring 10b is fitted on a cylindrical portion 11 of the compressor support 12. A spacer washer 13 maintains a suitable distance between the rolling bearing 10, i.e., the pulley 1, and a shoulder 14 of the support 12. A circlip 15 serves as an axial stop to hold the rolling bearing 10 in position on the cylindrical part 11. Due to the radial rims 9a, the pulley 1 is also held in position relative to the compressor support 12.

In the example illustrated, an elastic block 16 of generally annular configuration, essentially square in cross section, is connected by mechanical means and/or overmoulding to the flange 8 of the pulley 1, while also bearing on one side of said flange 8, oriented towards the end of the shaft 2, against the bore of the cylindrical part 5. The connection between the elastic block 16 and the pulley 1 may be made by any suitable means.

The coupling flange 4 has an annular body 17 extended in the direction of the pulley 1 by a cylindrical shell 18 which abuts against the flange 8. The coupling flange 4 and the elastic block 16 are connected to one another by any suitable means such as mechanical means and/or by overmoulding. To this end, the bore of the elastic block 16 is in contact with the external cylindrical surface of the shell 18. The single elastic block 16 illustrated in the figures may be replaced by several individual elastic blocks distributed over the periphery of the cylindrical shell 18. In all cases, the interposition of this elastic block 16 enables damping of the torsional vibration between the pulley 1 and the coupling flange 4.

It is also conceivable to eliminate the elastic block 16 and to couple the coupling flange 4 directly to the pulley 1. The coupling flange may be separate from the pulley or integrated into the latter in order to constitute a single piece. The possible vibration is then absorbed, if necessary, by the nature of the materials used or the shape of the parts in question. In any case, whether or not an elastic block 16 is used, the pulley 1 is preferably made of a material that is both strong and light such as a composite based on glass fibres or on carbon fibres embedded in a synthetic resin. The pulley 1 may advantageously be overmoulded directly onto the external ring 10a of the rolling bearing 10. The coupling flange 4 may also be made of a material of the same type or of a moulded unreinforced synthetic resin.

Figure 2:
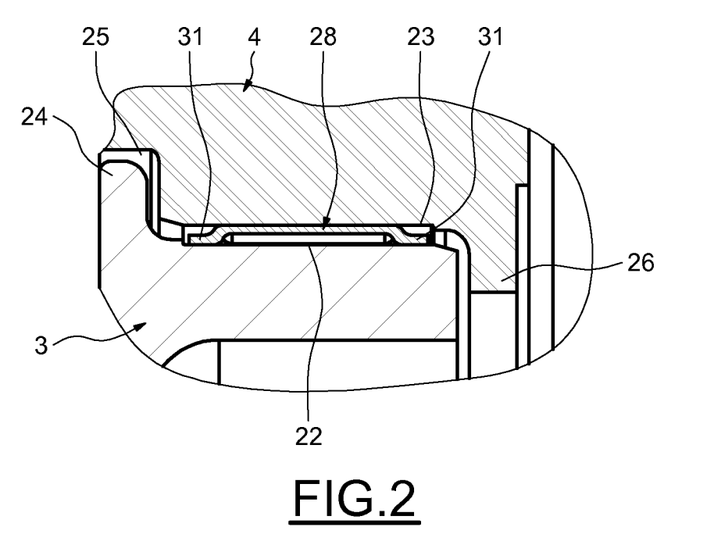
FIG. 2 is an enlarged detail view from FIG. 1.

The hub 3 comprises a central drilling 19 which is passed through by an extension 20 of the shaft 2, said extension 20 having a threaded end which cooperates with a clamping nut 21. Due to the presence of this nut 21, the coupling flange 3 is clamped against the shoulder 2a at the end of the shaft 2. The cylindrical external surface 22 of the hub 3 is positioned facing the bore 23 of the coupling flange 4 (FIG. 2) with a separation or gap between these two surfaces. The hub 3 is completed by an annular end rim 24 which is housed inside a recess 25 formed in the coupling flange 4. The coupling flange 4 in turn has a partial annular border 26, positioned between the hub 3 and the rolling bearing 10 (FIG. 1). The hub 3 is preferably made of a metal material and may be hollowed out in several locations 27 in the interest of making it lighter.

Figure 3:
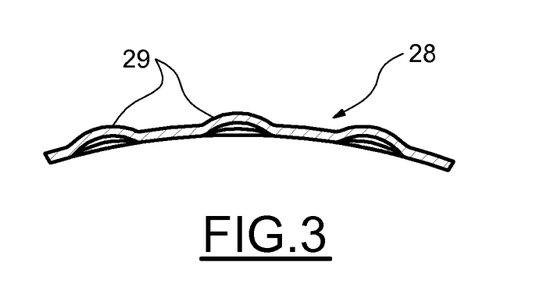
FIG. 3 is a partial side view of the friction ring used in the device illustrated in FIGS. 1 and 2.
Figure 4:
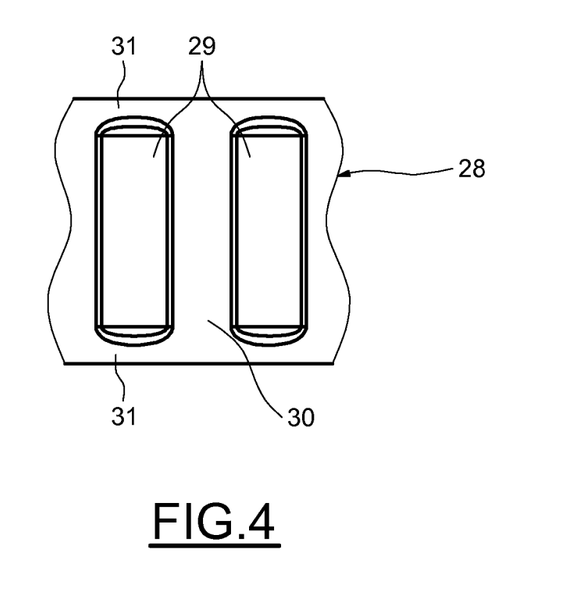
FIG. 4 is a partial view from above of the friction ring.
Figure 5:
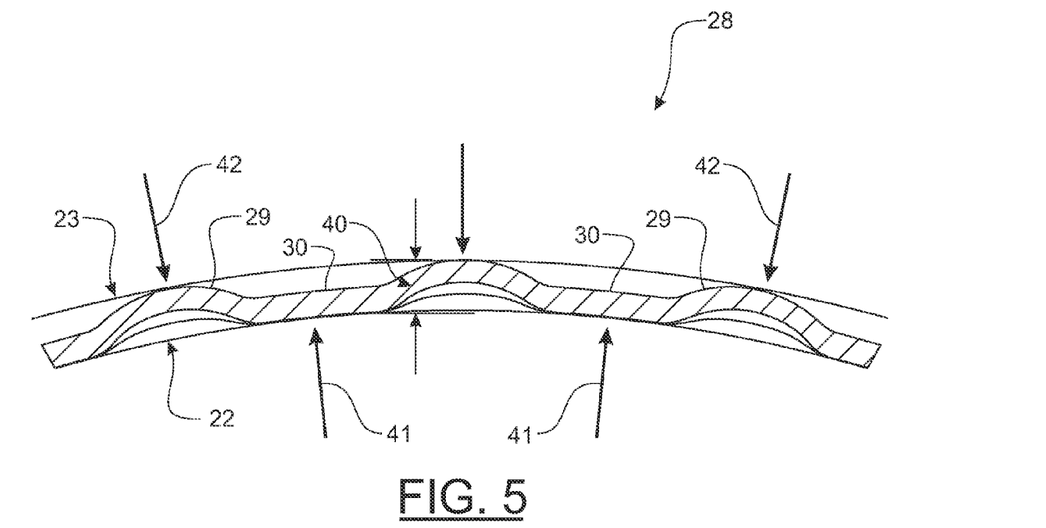
FIG. 5 is a partial side view of the friction ring used in the device illustrated in FIGS. 1 and 2, the illustration presenting a radial gap and a prestressed configuration.

In the radial interval or gap, which is left free between the cylindrical surface 22 of the hub 3 and the bore 23 of the coupling flange 4 (FIG. 2), a friction ring 28 is fitted, playing the role of a torque limitation means. To this end, the ring 28 visible in FIGS. 2 to 4 has a plurality of projecting elastic portions 29 which, in the example illustrated, have been made by deforming the thin material constituting the elastic ring 28 and exhibiting the form of bosses of generally rectangular shape, the long axis of which is oriented axially. The ring 28 may be made, for example, from a strip of stainless steel. The elastic portions or bosses 29 occupy the central part 30 of the friction ring 28 while leaving two end parts 31 lacking bosses. In the example illustrated, the friction ring 28 is fitted to the cylindrical surface 22 of the coupling flange 3 and in contact with said cylindrical surface. In contrast, the projecting bosses 29 come into contact with the bore 23 of the coupling flange 4. The radial thickness 40 of the friction ring 28, provided with its projecting elastic portions 29, is greater than the gap or separation existing between the opposite surfaces 22 and 23 creating a compression force. A radial prestressing is therefore established between two cylindrical bearing surfaces, one being the cylindrical surface 22 of the hub 3 creating a first compression force 41 and the other the bore 23 of the coupling flange 4 creating a second compression force 42. The friction ring 28 may be a split ring or on the contrary a continuous annular ring. The ring 28 may also be formed from several elements.

The transmission device thus described works in the following manner:

As long as the torque to be transmitted from the pulley 1 to the shaft 2 remains less than a threshold, the prestressing of the friction ring between the hub 3 and the coupling flange 4 is sufficient for the torque transmitted by the pulley 1 and the coupling flange 4 to be completely transmitted to the hub 3 and to the shaft 2 to which it is joined. When the torque to be transmitted becomes too large and exceeds the aforementioned threshold, for example in the event that the shaft 2 becomes blocked, slippage of the contact surface is produced between the friction ring 28 and one of the parts constituted by either the hub 3 or the coupling flange 4, according to the respective coefficients of friction. The coupling flange 4 can then turn relative to the hub 3 and to the shaft 2 without risking damaging some elements of the kinematic linkage. The friction ring 28 plays the role, so to speak, of a mechanical fuse in the transmission of torque between the pulley 1 and the shaft 2.

Figure 6:
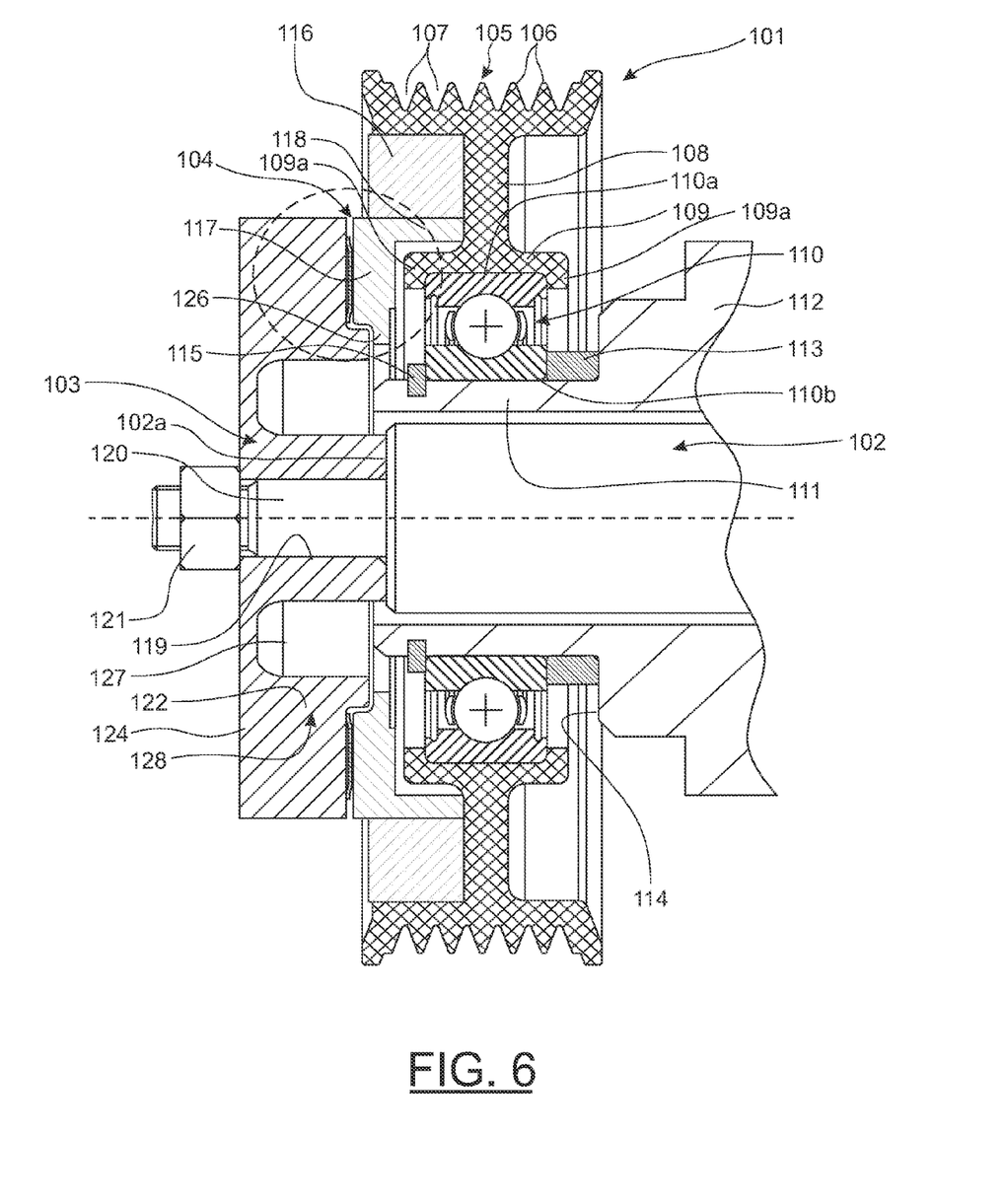
FIG. 6 is a cross-sectional view of an embodiment of the invention suited to an air conditioner shaft for a motor vehicle.
Figure 7:
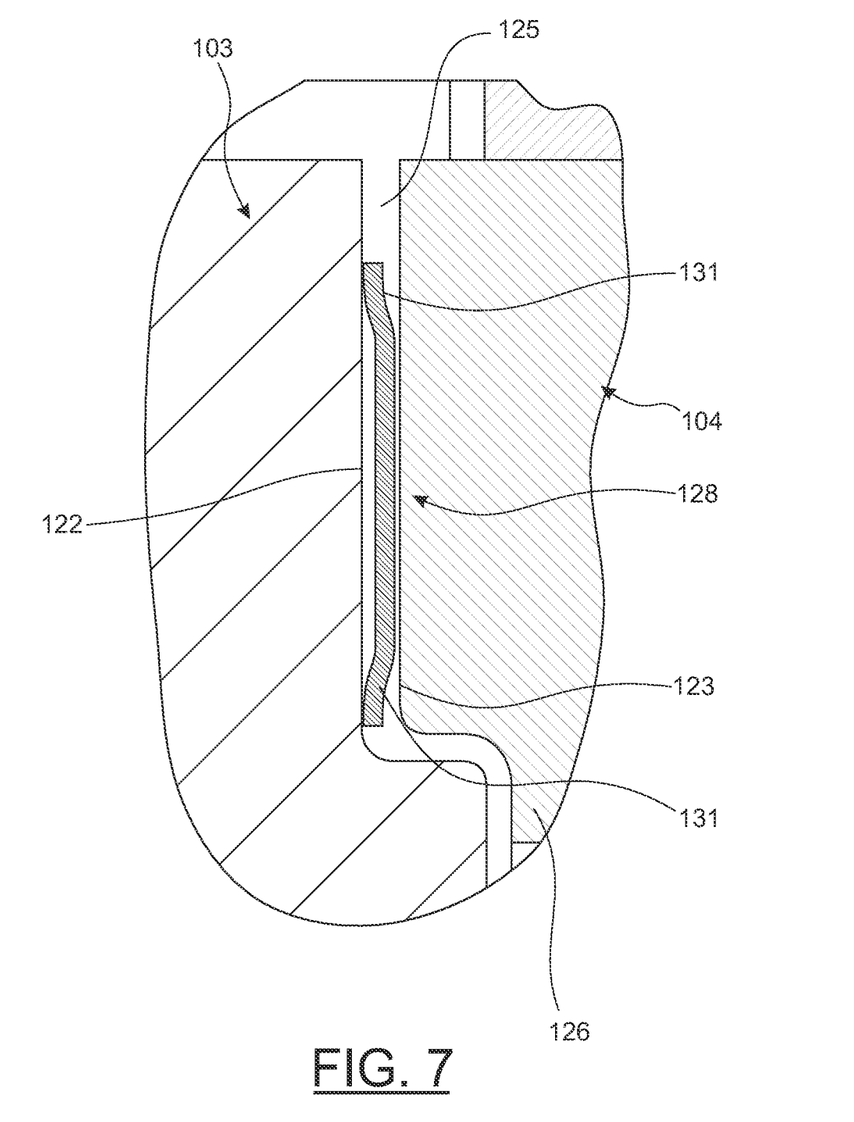
FIG. 7 is an enlarged detail view from FIG. 6.
Figure 8:
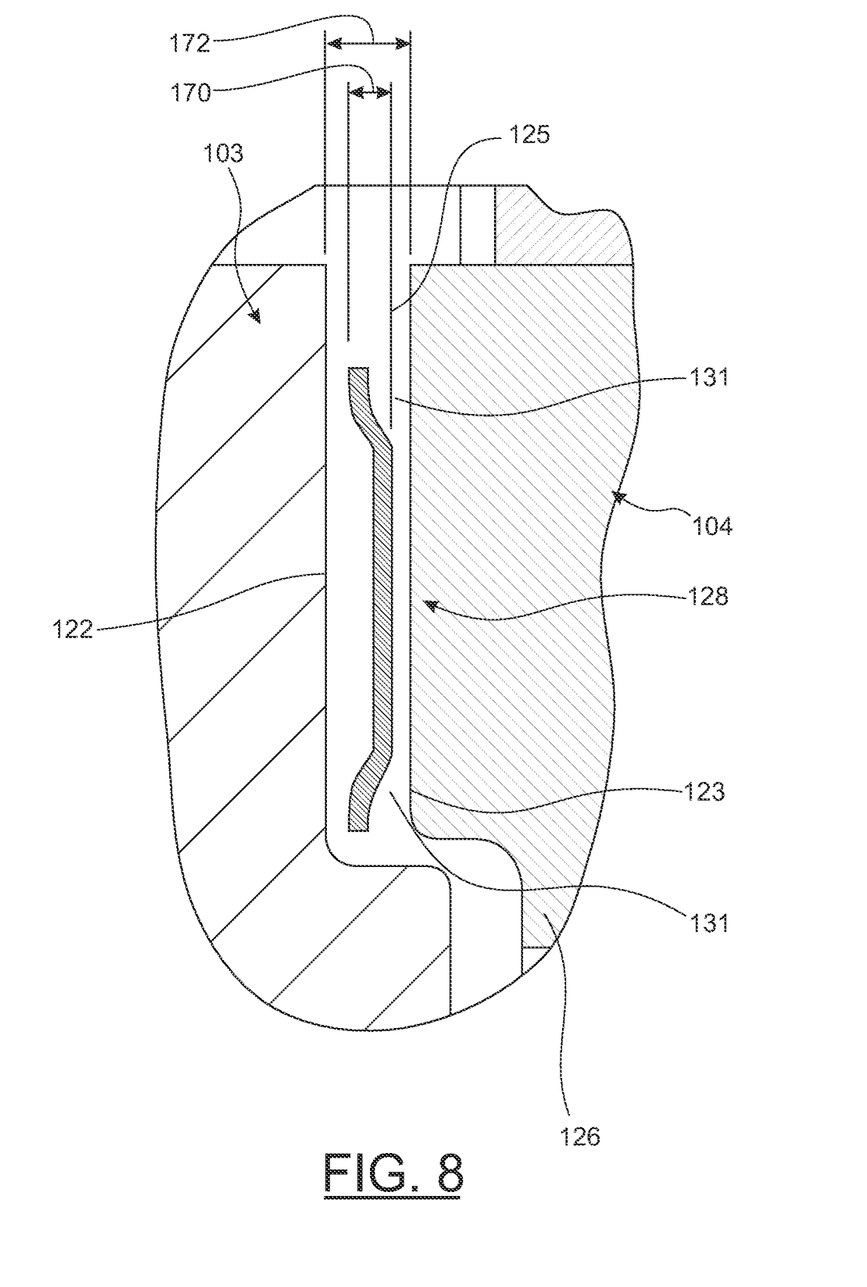
FIG. 8 is an enlarged detail view from FIG. 6, wherein the hub and coupling flange are separated axially from one another to illustrate dimensional details of the friction ring and a respective gap between the hub and the coupling flange.

In a second exemplary embodiment, the friction ring 128 is formed as an axial flange and inserted between two radial surfaces (a hub radial surface 122 and a coupling flange radial surface 123 of a drive pulley 101, as illustrated in FIGS. 6-8. Like elements of the drive pulley 101 and the drive pulley 1 are numbered the same except the elements of the drive pulley 101 are incremented from the elements of the drive pulley 1 by 100. The drive pulley 101 is similar to the drive pulley 1, wherein the drive pulley 101 includes a friction ring 128 having an axial flange, whereas the drive pulley 1 includes a friction ring 128 having a radial flange. To better illustrate dimensions, a pertinent section of the drive pulley is shown axially separated in FIG. 8. The friction ring 128 includes a plurality of projecting elastic protrusions, collectively defining a friction ring flange axial thickness 170. When assembled, an axial gap 172 has a value less than the friction ring flange axial thickness 170 in a free state such that the friction ring is pre-stressed between the two radial surfaces.

Although a particular example has been described, using a radially prestressed friction ring, it will be understood that it is also possible to use, still within the scope of the present invention, an axially prestressed flange between two radial surfaces respectively defined over the hub 3 and over the coupling flange 4, the flange having projecting elastic portions. In addition, although the projecting elastic portions have been illustrated in the form of bosses, it will be understood that it is also possible to use a friction element having a plurality of undulations, or alternatively a plurality of elastic tabs.

The invention claimed is:

1. A device for torque transmission between a drive pulley and a shaft, the shaft having an end, the device comprising:
    a drive pulley,
    a coupling flange rotationally driven by the drive pulley, wherein the drive pulley comprises features for engagement with and retention of at least one of a V-belt and a single belt of a motor vehicle engine,
    a hub fitted at the shaft end and rotationally joined to the shaft,
    an elastic block in axial communication with a radial surface of the drive pulley and in radial communication with the coupling flange, wherein the elastic block provides a dampening force to the torque transmission device, and
    a torque-limiting friction ring having a plurality of projecting elastic portions extending radially therefrom, the torque-limiting friction ring fabricated having a unitary structure,
        wherein the torque-limiting friction ring is disposed between the coupling flange and the hub, the plurality of projecting elastic portions arranged in frictional contact with a surface of one of the coupling flange and the hub, and the torque-limiting friction ring providing a between the coupling flange and the hub, wherein the frictional interface transfers a rotational motion of the coupling flange to a rotational motion of the hub wherein the friction ring is formed as an axial flange between two radial surfaces,
    the coupling flange and the hub each have a radial surface, and
    the two radial surfaces defining an axial gap and the gap having a value less than an axial thickness of the friction ring flange in a free state such that the friction ring is prestressed between the two radial surfaces.

2. The device according to claim 1, wherein the dampening force provided by the elastic block is a torsional vibration.

3. A device for torque transmission between a drive pulley and a shaft, the shaft having an end, the device comprising:
    a bearing comprising an inner ring, an outer ring, and a plurality of roller bearings retained between the inner ring and outer ring enabling a rotational relationship between the inner ring and the outer ring, wherein the inner ring is designed to engage with a support member enabling free rotation of the outer ring and the drive pulley is supported by the outer ring;
    a coupling flange extending in axial communication with and rotationally driven by the drive pulley,
    an elastic block in axial communication with a radial surface of the drive pulley and in radial communication with the coupling flange, wherein the elastic block provides a dampening force to the torque transmission device,
    a hub fitted at the shaft end and rotationally joined to the shaft, and
    a torque-limiting friction ring having a plurality of projecting elastic portions extending radially therefrom, the torque-limiting friction ring fabricated having a unitary structure,
        wherein the torque-limiting friction ring is disposed between the coupling flange and the hub, the plurality of projecting elastic portions arranged in frictional contact with a surface of one of the coupling flange and the hub, and the torque-limiting friction ring providing a frictional interface between the coupling flange and the hub, wherein the frictional interface transfers a rotational motion of the coupling flange to a rotational motion of the hub.

4. The device according to claim 3, wherein the friction ring is made of a relatively thin elastic material and the projecting portions are formed by deforming the ring.

5. The device according to claim 3, wherein the projecting elastic portions are formed as undulations in the friction ring.

6. The device according to claim 3, wherein the projecting elastic portions are formed as bosses.

7. The device according to claim 6, wherein the bosses are disposed on a central part of the friction ring between two end parts without bosses.

8. The device according to claim 3, wherein the friction ring is split.

9. The device according to claim 3, wherein the flange and the hub each have a cylindrical bearing surface,
    the bearing surface of one of the flange and the hub extending circumferentially about the bearing surface of the other one of the flange and the hub so as to define a radial gap,
    the gap having a value less than the radial thickness of the ring in a free state, the friction ring being disposed within the gap such that the ring is radially prestressed between the two cylindrical bearing surfaces.

10. The device according to claim 3, wherein more than one elastic blocks are fitted between the pulley and the coupling flange.

11. The device according to claim 3, wherein the dampening force provided by the elastic block is a torsional vibration.

12. An air-conditioning compressor for motor vehicles, the compressor comprising:
    a drive pulley,
    a shaft having an end,
    a bearing comprising an inner ring, an outer ring, and a plurality of roller bearings retained between the inner ring and outer ring enabling a rotational relationship between the inner ring and the outer ring, wherein the inner ring is assembled to a support member, wherein the support member is concentric about the shaft, enabling free rotation of the outer ring and the drive pulley is supported by the outer ring, and
    a device for transmitting torque between the drive pulley and the shaft, the device including:
        a coupling flange extending in axial communication with and rotationally driven by the pulley,
        a hub fitted at the shaft end and rotationally joined to the shaft, and
        a torque-limiting friction ring having a plurality of projecting elastic portions extending radially therefrom, the torque-limiting friction ring fabricated having a unitary structure,
            wherein the torque-limiting friction ring is disposed between the coupling flange and the hub, the plurality of projecting elastic portions arranged in frictional contact with a surface of one of the coupling flange and the hub, and the torque-limiting friction ring providing a frictional interface therebetween, wherein, in use, rotational motion of the pulley rotates the coupling flange and the frictional interface transfers the rotational motion of the coupling flange to a rotational motion of the hub, and an elastic block in axial communication with a radial surface of the drive pulley and in radial communication with the coupling flange, wherein the elastic block provides a dampening force to the torque transmission device.

* * * * *